(12) United States Patent
Yamamoto et al.

(10) Patent No.: US 12,109,859 B2
(45) Date of Patent: Oct. 8, 2024

(54) ELECTRIC VEHICLE

(71) Applicant: Daimler Truck AG, Leinfelden-Echterdingen (DE)

(72) Inventors: Kotaro Yamamoto, Kawasaki (JP); Senthil Arumugam, Kawasaki (JP); Gowtham Buthan, Kawasaki (JP)

(73) Assignee: Daimler Truck AG, Leinfelden-Echterdingen (DE)

( * ) Notice: Subject to any disclaimer, the term of this patent is extended or adjusted under 35 U.S.C. 154(b) by 0 days.

(21) Appl. No.: 18/292,728

(22) PCT Filed: Jun. 29, 2022

(86) PCT No.: PCT/JP2022/026035
§ 371 (c)(1),
(2) Date: Jan. 26, 2024

(87) PCT Pub. No.: WO2023/008065
PCT Pub. Date: Feb. 2, 2023

(65) Prior Publication Data
US 2024/0262148 A1 Aug. 8, 2024

(30) Foreign Application Priority Data
Jul. 29, 2021 (JP) ................................. 2021-123982

(51) Int. Cl.
*B60K 1/00* (2006.01)
*B60G 11/10* (2006.01)
*B60G 11/113* (2006.01)

(52) U.S. Cl.
CPC ...... *B60G 11/113* (2013.01); *B60G 2204/121* (2013.01); *B60G 2204/4306* (2013.01)

(58) Field of Classification Search
CPC ....... B60G 11/10; B60G 11/12; B60G 11/113; B60G 2204/121; B60G 2204/4306
See application file for complete search history.

(56) References Cited

U.S. PATENT DOCUMENTS 9,428,040 B2 * 8/2016 Shibata ............... B62D 25/082
9,573,452 B2 * 2/2017 Agnew ................... B60K 1/00
(Continued)

FOREIGN PATENT DOCUMENTS

CN 105073464 A 11/2015
DE 946 591 C 8/1956
(Continued)

OTHER PUBLICATIONS

International Preliminary Report on Patentability (PCT/IB/373) and Written Opinion (PCT/ISA/237) issued in PCT Application No. PCT/JP2022/026035 dated Jan. 18, 2024 (4 pages).
(Continued)

*Primary Examiner* — Thomas W Irvin
(74) *Attorney, Agent, or Firm* — Crowell & Moring LLP

(57) ABSTRACT

An electric vehicle includes a ladder frame and a driving unit, the driving unit including a motor that generates driving force to be transmitted to an axle of the electric vehicle and a transmission mechanism that shifts the driving force passed from the motor. The electric vehicle further includes a motor housing that accommodates the motor of the driving unit, a leaf spring that suspends the axle from the electric vehicle, a first coupling part that couples the ladder frame to the motor housing, and a second coupling part that is integrated with the first coupling part and that couples the ladder frame to an end part of the leaf spring. The second coupling part has a rib-shaped portion that protrudes outward in the vehicle width direction and that is connected to the end part the leaf spring.

6 Claims, 5 Drawing Sheets

(56) References Cited

U.S. PATENT DOCUMENTS

| | | | | |
|---|---|---|---|---|
| 10,889,173 | B2* | 1/2021 | Yohannes | F16H 57/025 |
| 11,420,514 | B2* | 8/2022 | Ellis | B60K 7/0007 |
| 11,639,093 | B2* | 5/2023 | Yohannes | F16H 57/025 |
| | | | | 180/297 |
| 11,752,822 | B1* | 9/2023 | Leith | B60G 15/067 |
| | | | | 280/680 |
| 2015/0375783 | A1 | 12/2015 | Yamamoto et al. | |
| 2020/0086731 | A1* | 3/2020 | Yohannes | F16H 57/025 |
| 2020/0156707 | A1 | 5/2020 | Kandori | |
| 2021/0078397 | A1* | 3/2021 | Ito | B60K 5/1216 |
| 2022/0016970 | A1* | 1/2022 | Ellis | B60K 7/0007 |
| 2022/0274481 | A1* | 9/2022 | Ellis | B60K 1/00 |

FOREIGN PATENT DOCUMENTS

| | | |
|---|---|---|
| JP | 2000-326860 A | 11/2000 |
| JP | 2001-55032 A | 2/2001 |
| JP | 2019-43275 A | 3/2019 |
| JP | 2019-98882 A | 6/2019 |
| JP | 2019-189170 A | 10/2019 |
| JP | 2020-132101 A | 8/2020 |
| WO | WO 2014/148410 A1 | 9/2014 |
| WO | WO 2019/207986 A1 | 10/2019 |

OTHER PUBLICATIONS

International Search Report (PCT/ISA/210) issued in PCT Application No. PCT/JP2022/026035 dated Sep. 20, 2022, with partial English translation (5 pages).

Japanese-language Written Opinion (PCT/ISA/237) issued in PCT Application No. PCT/JP2022/026035 dated Sep. 20, 2022 (3 pages).

Chinese-language Chinese Office Action issued in Chinese Application No. 202280051332.5 dated May 10, 2024, with partial English translation (10 pages).

English-language Extended European Search Report issued in European Application No. 22849134.6-1009 dated Jul. 30, 2024 (5 pages).

* cited by examiner (A)

(B)

(C)

ELECTRIC VEHICLE

TECHNICAL FIELD

The present invention relates to an electric vehicle including a driving unit having a motor and a transmission mechanism and having a ladder frame structure.

BACKGROUND ART

In recent years, in the field of a commercial vehicle having a ladder frame structure such as a truck and a pick-up truck, effort is being made to develop an electric vehicle from which an internal combustion engine has been abolished but which in turn uses only an electric motor as a driving source from the viewpoint of reducing environmental loading. A known driving unit to be mounted on such an electric vehicle is exemplified by a driving unit for a vehicle which unit includes an electric motor and a power transmission mechanism such as a transmission device including multiple gears and is configured to transmit the driving force of the electric motor to the differential gear connected to the driving wheels (see Patent Document 1).

PRIOR ART DOCUMENTS

Patent Document

[Patent Document 1] WO 2014/148410

SUMMARY OF INVENTION

Technical Problem

Here, an electric truck, which has a larger vehicle weight than an ordinary electric vehicle, requires greater driving torque than the electric vehicle, and consequently requires a motor supporting bracket having a high rigidity to mount a driving motor to the vehicle body. In such a motor supporting bracket, since a large load can be input into the left- and right-bending direction (vehicle width direction), the material for the bracket is demanded to be thickened. On the other hand, from the viewpoint of desiring to ensure reliability without increasing the weight by wall-thickening, one of the solutions is to increase the cross-sectional secondary moment by forming a rib (plate-like reinforcing structure) on the surface of the motor supporting bracket.

However, forming the above rib increases the size of the motor supporting bracket by a dimension of the rib and, for example, the size of the motor supporting bracket in the vehicle longitudinal direction is increased. In addition to this, components such as a driving unit and related device (E-Axle related equipment) to the driving unit may be placed around the motor supporting bracket. Therefore, it is sometimes difficult to form the ribs that can avoid interference between the motor supporting bracket and such components.

With the problems in view, the object of the present invention is to provide an electric vehicle in which a structure for supporting a driving unit on the electric vehicle can satisfy a high-rigidity requirement without hindering the mountability and the degree of freedom of layout of other components.

Solution to Problem

The present invention has been made in order to solve at least part of the above problem, and can be achieved in the form of the following embodiment or application example.

(1) The electric vehicle according to the present application example is electric vehicle including a ladder frame and a driving unit and the driving unit includes a motor that generates driving force to be transmitted to an axle of the electric vehicle and a transmission mechanism that shifts the driving force passed from the motor. The electric vehicle includes: a motor housing that accommodates the motor of the driving unit; a leaf spring that suspends the axle from the electric vehicle; a first coupling part that couples the ladder frame to the motor housing; and a second coupling part that is integrated with the first coupling part and that couples the ladder frame to an end part of the leaf spring. Further, the second coupling part has a rib-shaped portion that protrudes outward in the vehicle width direction and that is connected to end part the leaf spring.

As described above, the motor housing is coupled to the ladder frame by the first coupler part and the end part of the leaf spring is coupled to the ladder frame by the second coupler part having the rib-shaped portion. By integrating the first coupler part and the second coupler part and using the rib-shape provided as a leaf spring supporting bracket (second coupler part) also for a motor supporting bracket (first coupler part), the motor supporting bracket can be reinforced without increasing the size thereof and also increase its rigidity. Further, since the entire shape of the bracket including the first coupler part and the second coupler part is made compact in size, the leaf spring supporting bracket and the motor supporting bracket less interfere with other neighboring components in a rear axle area, which requires the arrangement of E-Axle related components and wiring, so that the mountability and the degree of freedom of layout of the components, the wiring, and pipes can be enhanced.

(2) In electric vehicle according to the present application example, in the above (1), the first coupling part may include a plate member attached to a web outer face of a side rail of the ladder frame, and a bracket part that extends downward from a flange lower face of the side rail and that is connected to the motor housing. This ensures the contact area with the web of the side rail and causes the first coupler part to be coupled to the motor housing under the lower face of the flange of the side rail. Accordingly, this makes the bracket including the first coupler part and the second coupler part to be strongly fixed to the side rail and further less likely to interfere with other neighboring components.

(3) In electric vehicle according to the present application example, in the above (2), the first coupling part further may include a pair of the plate members; and the rib-shaped portion may be sandwiched between the pair of the plate members. This makes the rib-shaped portion to be strongly fixed to the web outer face of the side rail, so that the stiffness of the first coupler part and the second coupler part is further enhanced.

(4) In electric vehicle according to the present application example embodiment, in any of the above-described (1) to (3), a position where the bracket member is coupled to the motor housing in a vehicle longitudinal may be substantially the same as a position where the rib-shaped portion is coupled to the leaf spring. This further enhances the stiffness of the first coupler part and the second coupler part.

(5) The electric vehicle according to the present application example may include a pair of planer portions spaced apart in a vehicle longitudinal direction and a connecting part that connects the planer portions with each other, in any one of the above (1) to (4). This further increases the stiffness of the rib-shaped portion, and the rigidity of first coupler part and second coupler part is further enhanced.

In the above electric vehicle (3), one of the planar portions may be connected to one of the pair of plate members, and the other of the planar portions may be connected to the other of the pair of plate members. Consequently, each of the pair of plate members is reinforced by one of the pair of planar portions so that the stiffness of the first coupler part and the second coupler part is further enhanced.

(6) In electric vehicle according to the present application example, in any one of the above-mentioned (1) to (5), the first coupling part may include a second rib-shaped portion formed into a shape protruding outward in the vehicle width direction. This further increases the stiffness of the bracket member of the first coupler part and this further enhances the stiffness of the first coupler part and the second coupler part.

Advantageous Effects

According to the electric vehicle of the present application example, it is possible to provide an electric vehicle in which a structure for supporting a driving unit on the electric vehicle can satisfy a high-rigidity requirement without impairing the mountability of other components.

DESCRIPTION OF EMBODIMENT(S)

[1. Structure]

Figure 1:
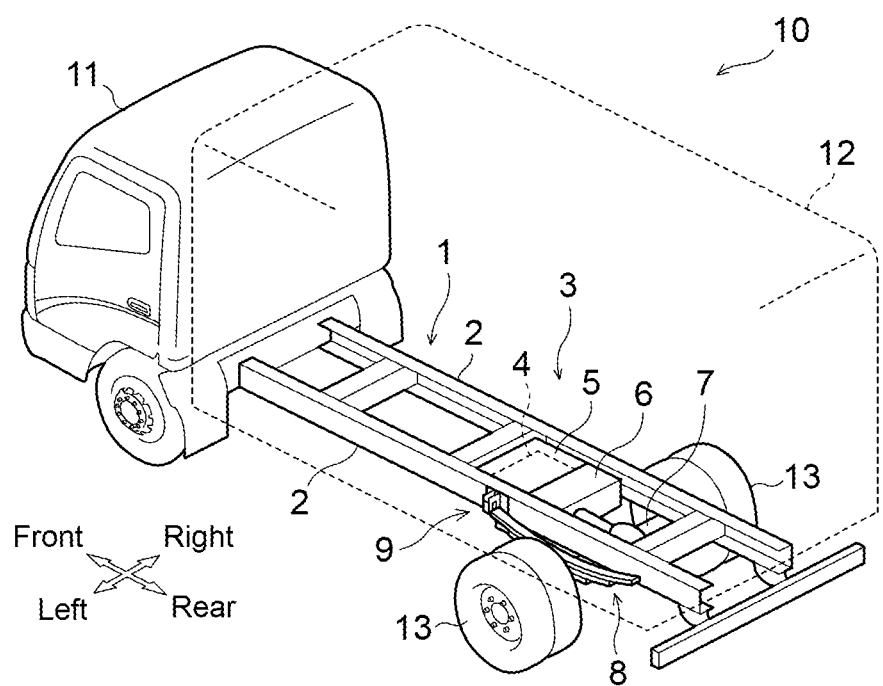
FIG. 1 is a perspective view showing a ladder frame structure of an electric vehicle according to a present application example.

Hereinafter, description will now be made in relation to an electric vehicle 10 as an embodiment (application example) with reference to the accompanying drawings. FIGS. 1, 2, and 3(A) to 3(C) are diagrams for explaining the structure of the electric vehicle 10 according to the present application example. The directions of front/rear, left/right, and up/down in the drawings are defined on the basis of the driver of the electric vehicle 10. As shown in FIG. 1, this electric vehicle 10 is an electric truck of the type in which the body is supported by a ladder frame 1 (chassis frame). The ladder frame 1 is a frame member formed into a ladder shape. A driving unit 3 (electric power-train), a cab 11, a cargo space 12, driving wheels 13, and others of the electric vehicle 10 are attached to the ladder frame 1.

The ladder frame 1 is provided with side rails 2 extending in the longitudinal direction (vehicle length direction) and cross members extending in the vehicle width direction (lateral direction). A pair of side rails 2 are spaced apart in the vehicle width direction. The cross members are joined to the left and right side rails 2 at a distance from one another in the longitudinal direction. The positions at which cross members are disposed are set in accordance with the components mounted on the ladder frame 1 and the load distribution. The cross-sectional shape of the side rail 2 is, for example, a channel shape. Each side rail 2 illustrated in FIG. 1 is of a channel shape having a C-shaped (U-shaped) cross-section, and is formed of a planar web 2A normal of which is arranged so as to face the vehicle width direction and flanges 2B which extend inward the vehicle width direction from the upper and lower ends of the web 2A.

The driving unit 3 is an electric power-train (electric traction unit) to drive the electric vehicle 10. This driving unit 3 includes, for example, a motor 4 and a transmission mechanism 6. The motor 4 is an electric motor that generates driving force to be transmitted to the axle 7 of the driving wheels 13 by consuming electric power and that is accommodated in the motor housing 5. The electric power consumed by the motor 4 is stored in a non-illustrated battery. Furthermore, the transmission mechanism 6 shifts the rotational driving force transmitted from the motor 4, and includes, multiple gears exemplified by a reduction gear and a gear mechanism for speed change. The driving force generated in the motor 4 is transmitted through transmission mechanism 6 to the differential gear (differential device) to which axle 7 is connected, so that the electric vehicle 10 can be driven. In the driving unit 3, the motor 4 is disposed on the vehicle front side nearer than the transmission mechanism 6.

The axle 7 of the driving wheels 13 is suspended from the ladder frame 1 through a leaf spring 8. The leaf spring 8 is a suspension spring having a structure of a bundle of several elastic strips piled on one another. This leaf spring 8 is formed into a shape extending in the longitudinal direction, and also curved such that the center portion in the longitudinal direction protrudes downward further than the end parts. The axle 7 of the driving wheels 13 is mounted beneath this center portion in the longitudinal direction. One end (e.g., the front end) of the leaf spring 8 places thereon a bush and is supported by the side rail 2 via an integral bracket 9 that is to be detailed below. In contrast, the other end (e.g., the rear end) of the leaf spring 8 is supported by the side rail 2 via a non-illustrated linkage mechanism. Any known structures can be applied to the detailed structures of the leaf spring 8 and the axle 7.

The integral bracket 9 is a member for attaching the motor housing 5 serving as a housing on the vehicle front side of the driving unit 3 and the leaf spring 8 to the ladder frame 1. FIG. 1 illustrates an integrated bracket 9 for attaching the left side of the motor housing 5 and the front end part of the left leaf spring 8 to the left side rail 2. Similar integral bracket 9 can also be arranged on the right side rail 2. In this application example, description will be made in relation to the structure of the integral brackets 9, focusing on the integral bracket 9 attached to the left side rail 2.

As shown in FIGS. 2 and 3(A) to 3(C), the integral bracket 9 are provided with a first coupler part 21 and a second coupler part 22. The first coupler part 21 is a portion that couples the side rail 2 of the ladder frame 1 to the motor housing 5. The motor housing 5 is supported by the first coupler part 21 via a shaft-shaped member 33 (or a fastener such as a bolt, a nut, a rivet). The second coupler part 22 is a connecting member formed integrally with the first coupler part 21, and is a portion that couples the side rail 2 of the ladder frame 1 to the end part of the leaf spring 8. The end part of the leaf spring 8 is supported by the second coupler part 22 via a shaft-shaped member 40 (or a fastener).

Figure 2:
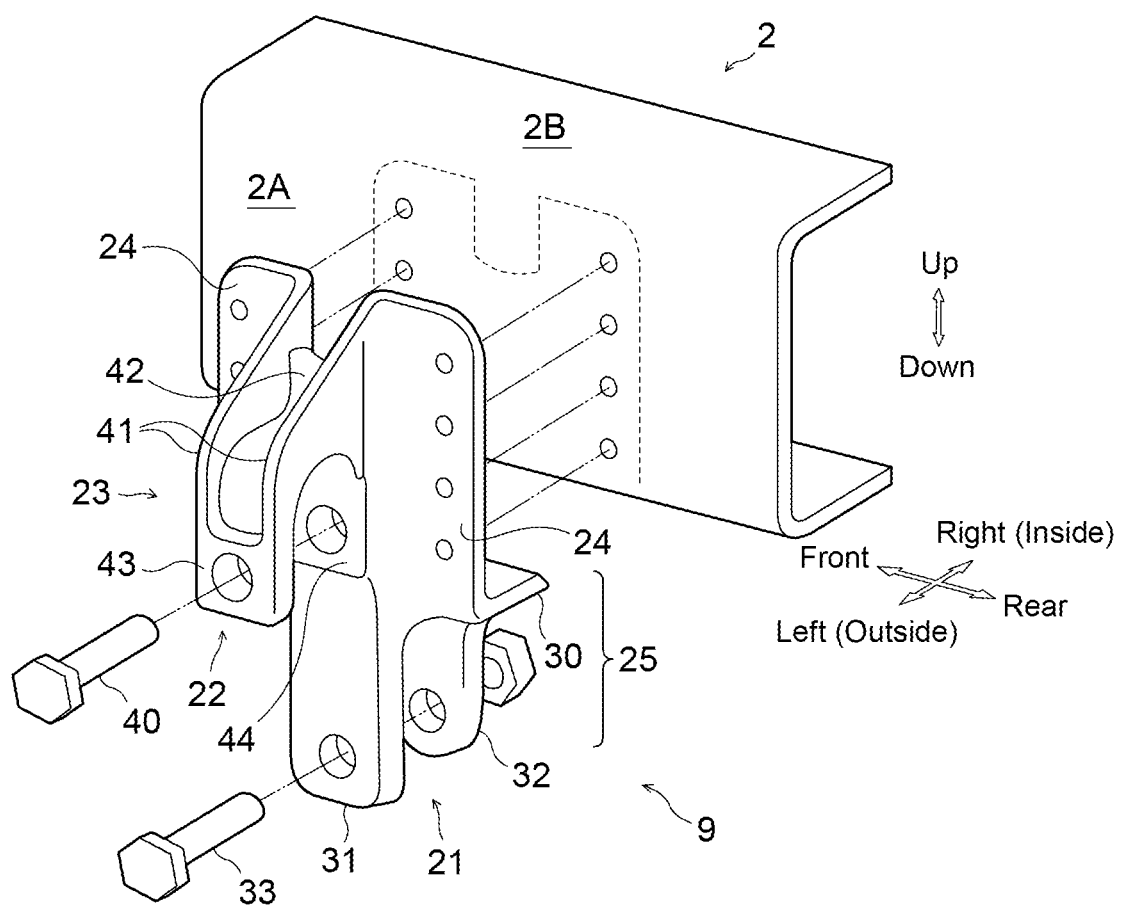
FIG. 2 is an exploded perspective view showing the structure of an integral bracket shown in FIG. 1.
Figure 3A:
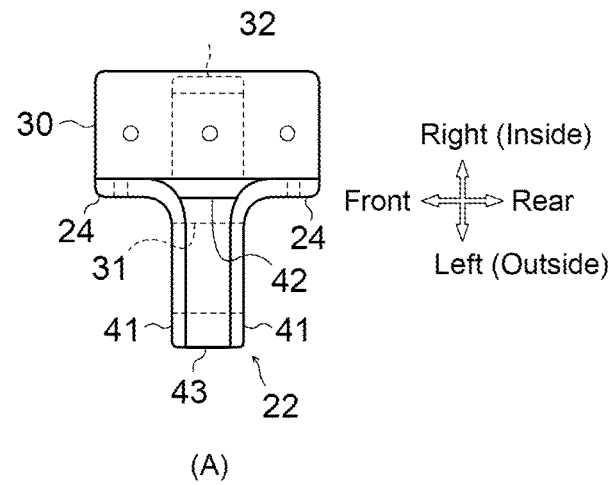
FIG. 3 is trihedral figures of the integral bracket shown in FIG. 2, (A) being a top view, (B) being a side view, (C) being a front view.
Figure 3B:
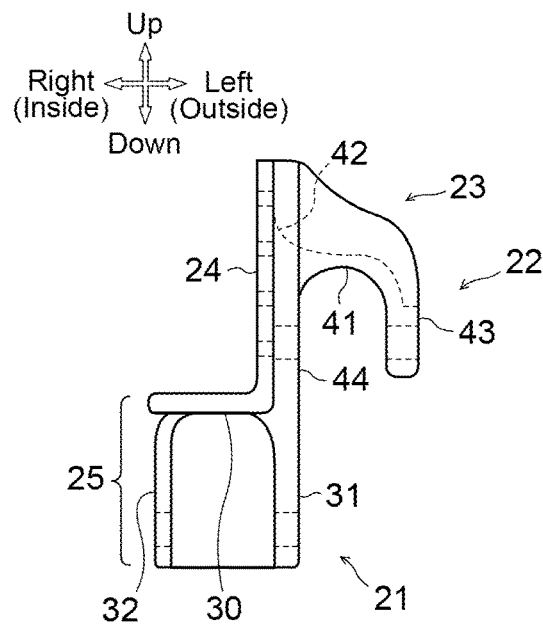
Figure 3C:
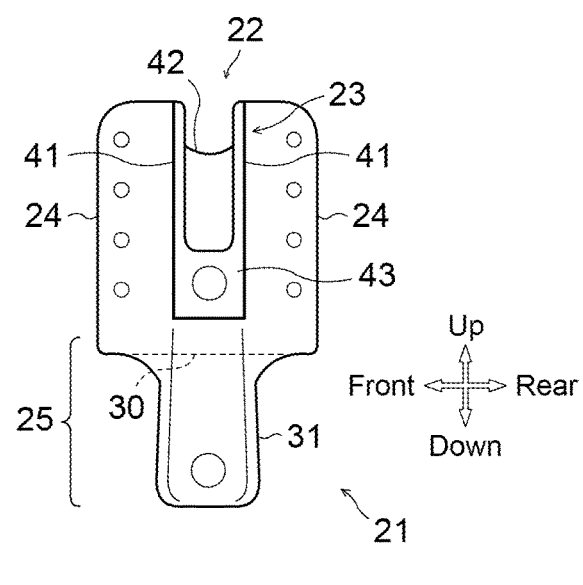

The first coupler part 21 is provided with a plate member 24 and a bracket member 25. The plate member 24 is a planar portion that is attached to the outer face of the web 2A of the side rail 2. In the example shown in FIG. 2, a pair of plate members 24 are provided, being spaced apart in the vehicle longitudinal direction, and are positioned on the same plane. The plate members 24 are fixed via a fastener being in a face contact with the outer face of the web 2A of the side rail 2. As shown in FIGS. 3(A) to 3(C), multiple holes through which the fasteners are inserted are formed on each plate member 24.

The bracket member 25 extends downward from the lower face of the flange 2B of the side rail 2 and is connected to the motor housing 5. The bracket member 25 is formed of a flat part 30 formed in a planar shape perpendicular to the plate member 24 and a first wall part 31 and a second wall part 32 each formed into a planar shape perpendicular to the flat part 30. The flat part 30 is attached to the lower face of the flange 2B of the side rail 2, being in face contact with the lower face. As shown in FIGS. 3(A) and 3(B), multiple holes through which a fasteners are inserted are also formed on the flat part 30. The flat part 30 is fixed to the lower face of the flange 2B via a non-illustrated fastener.

The first wall part 31 is a flat plate-shaped portion arranged on the same plane as the plate member 24. As shown in FIG. 3(C), the position of the first wall part 31 is set below the second coupler part 22 in a side view. The shape of the first wall part 31 is formed so as to extend downward from a portion sandwiched between the pair of the plate members 24 in a side view. A hole through which a shaft-shaped member 33 to be coupled to the motor housing 5 is inserted is provided near the lower end portion of the first wall part 31.

The second wall part 32 is a flat-plate-shaped portion arranged more inward in the vehicle width direction than the first wall part 31. The second wall part 32 is formed so as to extend downward from the flat part 30 and is arranged substantially parallel to the first wall part 31. A hole through which a shaft-shaped member 33 to be coupled to the motor housing 5 is inserted is provided near the lower end portion of the second wall part 32. The motor housing 5 is coupled to the first coupler part 21 via the shaft-shaped member 33 between the first wall part 31 and the second wall part 32.

The second coupler part 22 is provided with a rib-shaped portion 23. The rib-shaped portion 23 is a portion which protrudes outward in the vehicle width direction and is connected to end part of the leaf spring 8. Rib-shaped portion 23, as shown in FIGS. 2 and 3(C), is disposed so as to be sandwiched between the pair of plate members 24. As shown in FIG. 3(B), the outline of rib-shaped portion 23 can be regarded as a hook shape protruding outward from the plate member 24 and being arranged such that its tip directs downward. The rib-shaped portion 23 is provided with a pair of planar portions 41, a connecting part 42, a third wall part 43, and a fourth wall part 44.

As shown in FIGS. 3(A) to 3(C), the pair of planar portions 41 are planar portions that are spaced apart in the vehicle longitudinal direction. Each of the planar portions 41 is integrally formed with one of the pair of plate members 24, and is arranged along the direction perpendicular to the plate members 24. In other words, one of the pair of planar portions 41 are connected to one of the pair of plate members 24, the other of the planar portion 41 is connected to the other of the plate members 24. With this structure, the planar portion 41 functions as a flange that reinforces the end sides in the longitudinal direction of the plate members 24, so that the stiffness of the integral bracket 9 is enhanced. In addition, each of the pair of plate member 24 is reinforced by one of the pair of planar portions 41, so that the stiffness of the first coupler part 21 and the stiffness of second coupler part 22 are further enhanced.

The connecting part 42 is a planar member that connects between the pair of planar portions 41. The orientation of the connecting part 42 is set, for example, substantially perpendicular to each of the pair of the planar portions 41. In the example shown in FIG. 3(B), the connecting part 42 is formed into a curved shape so as to conform to the hook-shaped rib-shaped portion 23. For example, the portion inward of the vehicle width direction [left side in FIG. 3(B)] of the connecting part 42 is approximately vertically formed so as to be flush with the plate members 24. Like the planar portions 41, the portion outward of the vehicle width direction [right side in FIG. 3(B)] of the connecting part 42 protrudes outward from the plate members 24 and is formed such that its tip directs downward.

Like the connecting part 42, the third wall part 43 is a planar portion that connects between the pair of planar portions 41 and is provided at the tip portion of the rib-shaped portion 23. The orientation of the third wall part 43 is set substantially parallel to the plate member 24. As shown in FIG. 2, a hole through which the shaft-shaped member 40 to be connected to the leaf spring 8 is inserted is formed on the third wall part 43. The fourth wall part 44 is a planar portion provided on the base end part of the rib-shaped portion 23, and is arranged substantially parallel to the third wall part 43. Preferably, the fourth wall part 44 is integrally formed with the pair of plate members 24 so as to be flush with the pair of plate members 24. A hole through which the shaft-shaped member 40 is inserted is formed on the fourth wall part 44. The leaf spring 8 is coupled to the second coupler part 22 via the shaft-shaped member 40 between the third wall part 43 and the fourth wall part 44.

As shown in FIGS. 2 and 3(C), the position in vehicle longitudinal direction of the shaft-shaped member 33 to be connected to motor housing 5 is set at substantially the same position as the position in vehicle longitudinal direction of the shaft-shaped member 40 to be connected to the leaf spring 8. In other words, the coupling position of motor housing 5 of the bracket member 25 in vehicle longitudinal direction is set to substantially the same position (in other words, near) as the coupling position of the rib-shaped portion 23 to the leaf spring 8. If it is assumed that these coupling positions are displaced in the vehicle longitudinal direction, the load acting on each of the two coupling positions (e.g., the load due to the own weight of the driving unit 3 and the load due to the operation of the driving unit 3) cause a local moment to act on the side rails 2, so that the stability of the states of coupling at the respective position may be degraded. On the other hand, since the coupling positions in the vehicle longitudinal direction of the present application example are the same, the moment as described above is less likely to be generated on the side rails 2, so that the stability of the states of coupling at the respective position are enhanced.

[2. Actions and Effects]

(1) In the above electric vehicle 10, the motor housing 5 accommodating the motor 4 of the driving unit 3 is coupled to the ladder frame 1 by the first coupler part 21. On the other hand, the end part of the leaf spring 8 is coupled to the ladder frame 1 by the second coupler part 22 having the rib-shaped portion 23. By integrating the first coupler part 21 and the second coupler part 22 and using the rib shape serving as the leaf spring supporting bracket (second coupler part 22) also for the motor supporting bracket (first coupler part 21), the supporting brackets can reinforce each other, avoiding excessive increase in the sizes thereof, and also increase its rigidity. Further, since the entire shape of the integral bracket 9 containing the first coupler part 21 and the second coupler part 22 is made compact in size, the leaf spring supporting bracket (second coupler part 22) and the motor supporting bracket (first coupler part 21) less interfere with another neighboring components in a rear axle area, which requires the arrangement of E-Axle related components and wiring, so that the mountability of the components onto the vehicle 10 can be enhanced. Therefore, according to the above electric vehicle 10, components for supporting the driving unit 3 on the electric vehicle 10 can satisfy a high-rigidity requirement without hindering the mountability and the degree of freedom of layout of other components, wiring, and pipes.

(2) In the above electric vehicle 10, the plate member 24 and the bracket member 25 are provided on the first coupler part 21 of the integral bracket 9. The plate member 24 is attached to the outer face of the web 2A of the side rail 2. The bracket member 25 extends downward from the lower face of the flange 2B of the side rail 2 and is connected to the motor housing 5. Such a structure makes it possible to fix the integral bracket 9 firmly to the web 2A, and also to couple the integral brackets 9 to the motor housing 5 under the side rail 2 so that the motor 4 can be securely supported. Further, since the coupling position between the first coupler part 21 and the motor housing 5 is below the lower face of the flange 2B of the side rail 2, it is possible to prevent interference between the motor housings 5 and the leaf spring 8 and consequently, to enhance the mountability of these components onto the vehicle.

(3) In the above electric vehicle 10, the rib-shaped portions 23 of second coupler part 22 are arranged so as to be sandwiched between the pair of plate members 24. For example, as shown in FIG. 2, a pair of plate members 24 are disposed so as to sandwich the rib-shaped portion 23 in the vehicle longitudinal direction, and the rib-shaped portion 23 is connected to both of these plate members 24. With such a structure, the pair of plate members 24 can be reinforced by the rib-shaped portion 23, so that the stiffness of the first coupler part 21 can be enhanced. In addition, the second coupler part 22 can be reinforced by the pair of plate members 24, and the rib-shaped portion 23 can be firmly fixed to the outer face of the web 2A, so that the stiffness of the second coupler part 22 can be enhanced. Therefore, the stiffness of the integral bracket 9 can be increased, and the state of attaching of the integral bracket 9 to the side rail 2 can be further secured.

(4) In the above electric vehicle 10, the coupling position in the vehicle longitudinal direction of the bracket member 25 to the motor housing 5 is set at substantially the same position as the coupling position of the rib-shaped portion 23 to the leaf spring 8. For example, as shown in FIGS. 2 and 3(C), the position in the vehicle longitudinal direction of the shaft-shaped member 33 coupled to the motor housings 5 is substantially the same as the position in the vehicle longitudinal direction of the shaft-shaped member 40 coupled to the leaf spring 8. Such a structure can further enhance the rigidity of the first coupler part 21 and the second coupler part 22.

(5) In the above electric vehicle 10, a pair of planar portions 41 and a connecting part 42 are provided on the rib-shaped portion 23 of second coupler part 22. The pair of planar portions 41 are spaced apart from each other in the vehicle longitudinal direction. The connecting part 42 is provided so as to connect between the pair of planar portions 41. With such a configuration, the rigidity of the rib-shaped portion 23 is further enhanced, and the rigidity of the first coupler part 21 and the second coupler part 22 can be further enhanced. Further, as shown in FIG. 2, since the pair of planar portions 41 are each formed integrally with one of the pair of plate members 24, the stiffness of first coupler part 21 and the second coupler part 22 can be further enhanced.

[3. Others]

The above embodiment is merely illustrative and is not intended to exclude the application of various modifications and techniques not explicitly described in the above embodiment. Each structure of the above embodiment can be variously modified and implemented without departing from the scope thereof. Besides, some of multiple elements can be selected or omitted according to the requirement, or may be combined with another technique known to the public.

FIGS. 4, and 5(A) to 5(C) are diagrams showing an integral bracket 9 applied to the electric vehicle 10 according to a modification. Like reference numbers in the modification designate the same or substantially the same as those of the above embodiment. The first coupler part 21 of the integral bracket 9 is provided with a second rib-shaped portion 50. The second rib-shaped portion 50 is a portion formed to reinforce the first coupler part 21, and is formed into a shape protruding outward or downward in the vehicle width direction.

Figure 4:
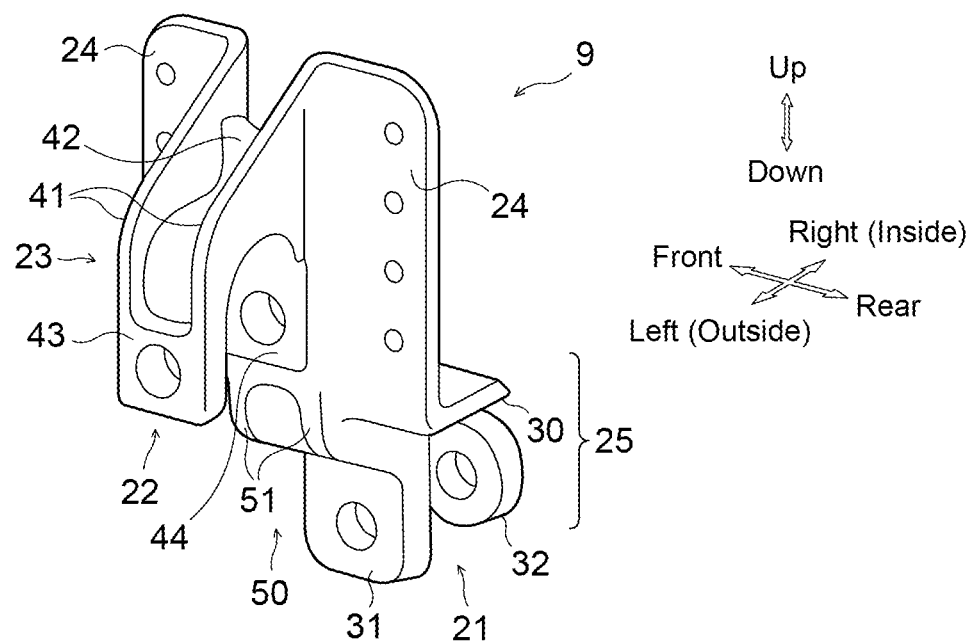
FIG. 4 is a perspective view showing a structure of an integral bracket according to a modification.
Figure 5A:
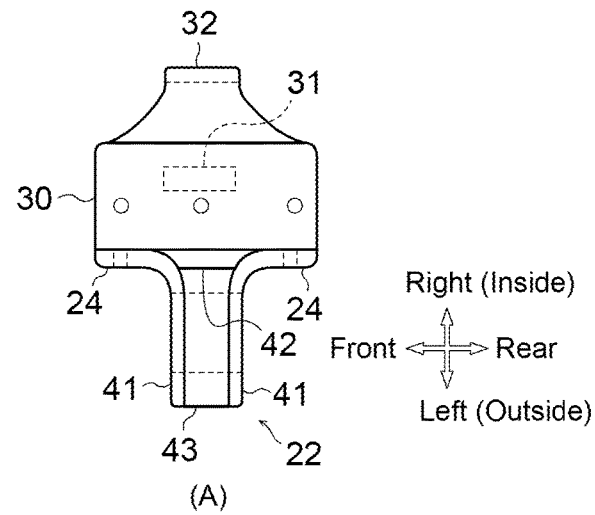
FIG. 5 is trihedral figures of the integral bracket shown in FIG. 4, (A) being a top view, (B) being a side view, (C) being a front view.
Figure 5B:
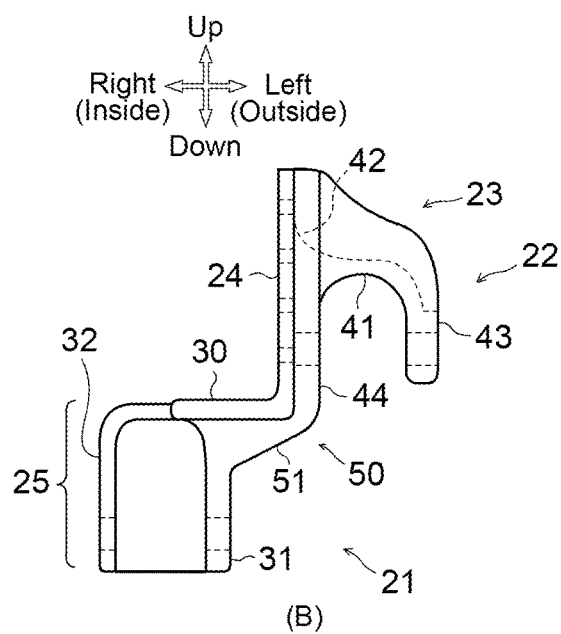
Figure 5C:
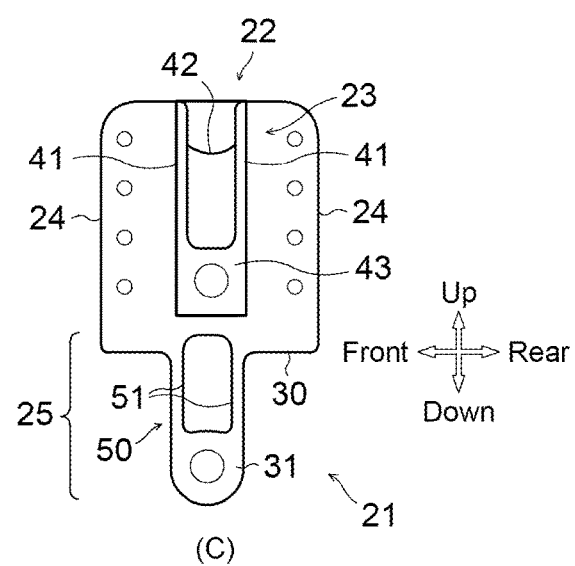

The second rib-shaped portion 50 shown in FIG. 4 is provided with a pair of second planar parts 51. The pair of second planar parts 51 are planar portions that are spaced apart in the vehicle longitudinal direction. Each second planar part 51 is integrally formed with the flat part 30 and is arranged along the direction perpendicular to the flat part 30. Thereby, the first coupler part 21 is reinforced by the second planar parts 51, and the stiffness of the integral bracket 9 is enhanced. The first wall part 31 and the second wall part 32 shown in FIGS. 4 and 5(A) to 5(C) are arranged at a more inner part in the vehicle width direction than the first wall part 31 and the second wall part 32 in the above embodiment. Correspondingly, each of the pair of second planar parts 51 is oriented perpendicularly to the first wall part 31 and is integrally connected to the both sides of first wall part 31 (one on the vertical side positioning on the front side of the vehicle and the other on the vertical side positioning on the rear side of the vehicle).

As a result, the second planar parts 51 function as a flange that reinforce the edge sides in the vehicle longitudinal direction of the first wall part 31 so that the stiffness of the first coupler part 21 is further enhanced. The second planar parts 51 also function to reinforce the flat part 30 and the plate member 24 formed integrally with the flat part 30, so that the stiffness of the second coupler part 22 can be further enhanced. Accordingly, the stiffness of the first coupler part 21 and the second coupler part 22 can be further strengthened. Furthermore, since the bracket member 25 is firmly fixed to the side rail 2, the state of coupling of the motor housing 5 can be further stabilized.

Description of Reference Sign 1 chassis frame (ladder frame)
2 side rail
2A web
2B flange
3 driving unit
4 motor
5 motor housing
6 transmission mechanism
7 axle
8 leaf spring
9 integral bracket
10 electric vehicle (vehicle)
11 cab 12 cargo space
13 driving wheel
21 first coupler part
22 second coupler part
23 rib-shaped part
24 plate member
25 bracket member
30 flat part
31 first wall part
32 second wall part
33 shaft-shaped member
40 shaft-shaped member
41 planar portion
42 connecting part
43 third wall part
44 fourth wall part
50 second rib-shaped part
51 second planer part

The invention claimed is:

1. An electric vehicle comprising a ladder frame and a driving unit, the driving unit comprising a motor that generates driving force to be transmitted to an axle of the electric vehicle and a transmission mechanism that shifts the driving force passed from the motor, the electric vehicle further comprising:
    a motor housing that accommodates the motor of the driving unit;
    a leaf spring that suspends the axle from the electric vehicle;
    a first coupling part that couples the ladder frame to the motor housing; and
    a second coupling part that is integrated with the first coupling part and that couples the ladder frame to an end part of the leaf spring, wherein
    the second coupling part has a rib-shaped portion that protrudes outward in the vehicle width direction and that is connected to the end part the leaf spring.

2. The electric vehicle according to claim 1, wherein the first coupling part comprises a plate member attached to a web outer face of a side rail of the ladder frame, and a bracket part that extends downward from a flange lower face of the side rail and that is connected to the motor housing.

3. The electric vehicle according to claim 2, wherein:
    the first coupling part further comprises a pair of the plate members; and
    the rib-shaped part is sandwiched between the pair of the plate members.

4. The electric vehicle according to claim 1, wherein a position where the bracket member is coupled to the motor housing in a vehicle longitudinal direction is substantially the same as a position where the rib-shaped part is coupled to the leaf spring.

5. The electric vehicle according to claim 1, wherein the rib-shaped part comprises a pair of planer portions spaced apart in a vehicle longitudinal direction and a connecting part that connects the planer portions with each other.

6. The electric vehicle according to claim 1, wherein the first coupling part comprises a second rib-shaped part formed into a shape protruding outward in the vehicle width direction.

* * * * *